No. 824,603. PATENTED JUNE 26, 1906.
A. R. TREICHEL.
CHRISTMAS TREE ATTACHMENT.
APPLICATION FILED FEB. 17, 1906.
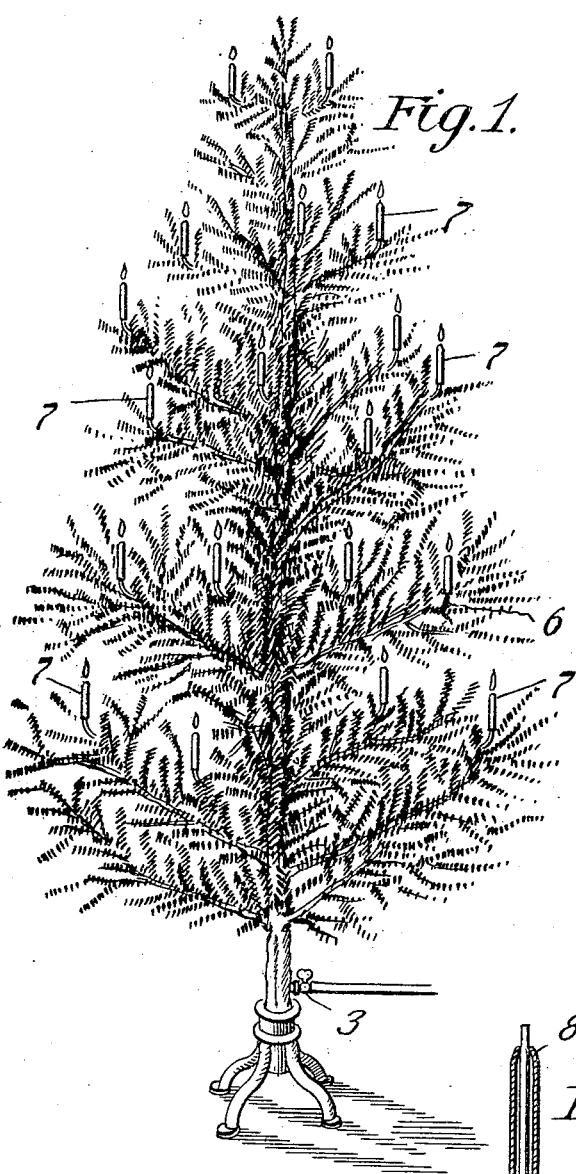
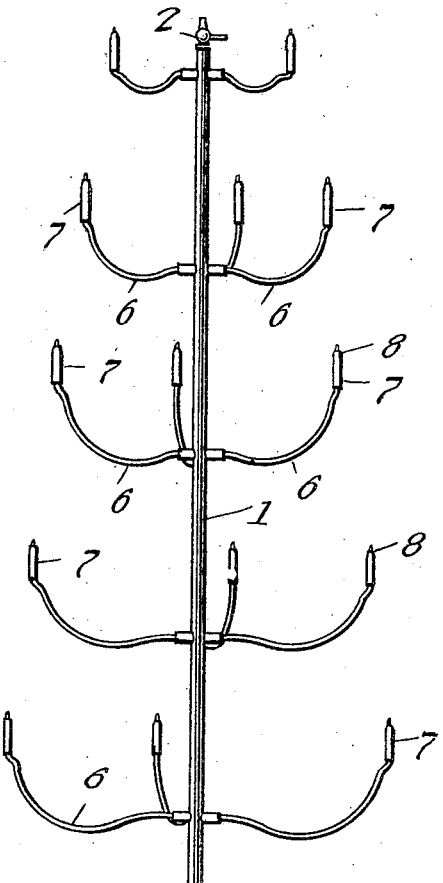
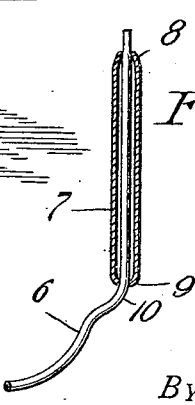
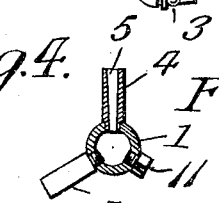
WITNESSES:
INVENTOR
A. R. Treichel
BY Victor J. Evans
Attorney.

UNITED STATES PATENT OFFICE.

ALBERT R. TREICHEL, OF ST. LOUIS, MISSOURI.

CHRISTMAS-TREE ATTACHMENT.

No. 824,603.          Specification of Letters Patent.          Patented June 26, 1906.

Application filed February 17, 1906. Serial No. 301,610.

*To all whom it may concern:*

Be it known that I, ALBERT R. TREICHEL, a citizen of the United States, residing at St. Louis, State of Missouri, have invented new and useful Improvements in Christmas-Tree Attachments, of which the following is a specification.

This invention relates to Christmas tree attachments, the object of the invention being to provide means for illuminating a Christmas tree, the said means being in the form of an attachment applicable to any Christmas tree and comprising, in connection with a main supply-pipe for illuminating-gas, a multiplicity of branches which are pliable and adapted to be bent, twisted, and connected with the limbs or branches of a tree and carried to any points thereon, each branch being equipped with a cylindrical sheath in representation of a candle, the construction and arrangement of the attachment being such that the said candles may be disposed at any point along the limbs or branches of the tree.

With the above general object in view the invention consists in the novel construction, combination, and arrangement of parts hereinafter more fully described, illustrated, and claimed.

In the accompanying drawings, Figure 1 is a perspective view of a tree with the attachment applied thereto. Fig. 2 is an elevation of the attachment *per se.* Fig. 3 is an enlarged detail cross-section through the main trunk-pipe, showing the branch nipples connected therewith. Fig. 4 is a detail sectional view of one of the cylindrical sheaths or candles applied to the end of one of the pliable branches of the device.

The attachment contemplated in this invention comprises a main trunk-pipe 1, provided at top and bottom with inlet-nozzles 2 and 3, respectively, either one of said nozzles being adapted to receive a flexible gas-pipe from a suitable gas-fixture or other source of supply.

The trunk-pipe 1 is adapted to extend upward along the trunk or body of the tree and may be secured thereto by lashing it against the tree with cord or rope, and said trunk-pipe is provided at suitable intervals along its length with radiating nipples 4, permanently connected to the pipe 1, as by a threaded joint, as shown in Fig. 3, each of said nozzles having a tapering and outwardly-flaring bore 5.

Connected to each of the nipples 4 is a flexible or pliable branch pipe 6, the inner end of which is inserted in the bore 5 of one of the nipples and soldered or otherwise firmly secured therein by a gas-tight joint. Each of the branch pipes 6 is preferably formed of pliable or bendable material, such as lead, and may be made of any suitable length.

Upon the outer end of each of the branch pipes 6 there is mounted a cylindrical sheath 7, having its outer and inner ends contracted, as shown at 8 and 9, respectively, to fit closely upon the tube 6, so that by bending said tube, as shown, at the point 10 a shoulder is formed against which the inner end of the sheath 7 rests. Ordinarily the shoulder 10 will be so disposed as to allow the extremity of the tube 6 to extend above the top of the sheath to represent the wick of an ordinary wax candle, while the sheath itself may be composed of metal, glass, pottery, or any desired material and painted or otherwise colored to closely represent a candle, thereby adding to the effect and attractive appearance of the attachment as a whole.

In the event that one or more of the branch pipes 6 is desired to be disposed of the nipple 4 containing said branch may be unscrewed from the trunk-pipe 1, and the opening therefor may be sealed by means of a plug or cap 11, as shown in Fig. 3.

From the foregoing description it will be seen that the branch tubes 6 may be bent and carried along the limbs of the tree to any desired point or they may be wrapped around said limbs, which thereby act as supports for the tubes. When the attachment is properly applied to a Christmas tree, only the different-colored candles or sheaths will be in sight. The flexible supply-pipe may be attached either to the upper or lower inlet-nozzle, as may be found most convenient.

I claim—

An attachment for the purpose described comprising a main trunk-pipe, nipples radiating therefrom at different intervals along the length of said pipe, flexible branch tubes connected to said nipples and leading outward therefrom, and cylindrical sheaths mounted upon the outer extremities of said branch tubes and having their outer and inner ends contracted to fit the branch tubes, the latter being adapted to be bent to form supporting-shoulders for the sheaths, substantially as described.

In testimony whereof I affix my signature in presence of two witnesses.

ALBERT R. TREICHEL.

Witnesses:
JACOB MILLER,
MATT J. SCHERER.